United States Patent [19]

Dirnfeld et al.

[11] Patent Number: 4,975,244

[45] Date of Patent: Dec. 4, 1990

[54] NON-FERROUS SOFT SOLDERING LEAD-TIN-ANTIMONY ALLOY COMPOSITIONS

[75] Inventors: Shraga Dirnfeld; Jean Ramon, both of Haifa, Israel

[73] Assignee: Technion Research & Development Foundation Ltd., Haifa, Israel

[21] Appl. No.: 417,607

[22] Filed: Oct. 5, 1989

Related U.S. Application Data

[63] Continuation-in-part of Ser. No. 327,267, Mar. 22, 1989, abandoned.

[51] Int. Cl.$^5$ ..................... C22C 11/06; C22C 11/10
[52] U.S. Cl. ..................................... 420/571; 420/589
[58] Field of Search ..................... 420/570, 571, 589

[56] References Cited

U.S. PATENT DOCUMENTS

| | | | |
|---|---|---|---|
| 1,301,688 | 4/1919 | Gurevich et al. | 420/570 |
| 2,303,193 | 11/1942 | Bouton et al. | 420/571 |
| 2,303,194 | 11/1942 | Bouton et al. | 420/571 |
| 4,231,794 | 11/1980 | Moranne | 420/571 |

FOREIGN PATENT DOCUMENTS

| | | | |
|---|---|---|---|
| 185012 | 8/1922 | United Kingdom | 420/571 |
| 186058 | 5/1923 | United Kingdom | 420/571 |

*Primary Examiner*—Theodore Morris
*Assistant Examiner*—Margery S. Phipps
*Attorney, Agent, or Firm*—Browdy and Neimark

[57] ABSTRACT

Soft soldering compositions posessing equal or better melting, wetting and strength properties than conventional straight tin-lead solders but with a reduced tin content are disclosed. The compositions consist of 1-35 wt % tin, 5-30 wt % cadmium 0.05-2.5 wt % antimony, balance essentially lead with 5-30 wt % cadmium, and/or 1-15 wt % bismuth. The solder alloys are characterized by their improved properties concerning solidification temperature gap, spread percentage, wetting time and shear strength. Specific compositions are disclosed having the necessary properties to successfully replace the tradional tin-lead solders containing 30, 40 and 50 wt % tin. The high temperature performance of bonds made with these new alloys are better because of their reduced tendency of intermetallic compounds formation with the substrate due to their lower tin content. In addition their production costs are attractive, being lower than those of their conventional tin-lead counterparts, making them competitive on the market of mechanical or electric mass-soldering applications.

8 Claims, No Drawings

ID="1" />

NON-FERROUS SOFT SOLDERING LEAD-TIN-ANTIMONY ALLOY COMPOSITIONS

CROSS-REFERENCE TO RELATED APPLICATION

The present application is a continuation-in-part of Ser. No. 07/327,267, filed Mar. 22, 1989, now abandoned the entire contents of which are hereby incorporated by reference.

BACKGROUND OF THE INVENTION

The present invention concerns new compositions for soft soldering, of lead-based alloys with tin, bismuth, cadmium and antimony. In soft soldering with tin-lead solders the interposed metal has normally a melting point between about 180° to 260° C.

The solder should adhere strongly to the metallic surfaces of the parts to be joined, by "wetting" them. This is readily seen as the spreading of a drop of molten solder upon contact with such a surface. Simultaneous with the wetting, the tin in the solder reacts with the wetted base metal, forming a layer of intermetallic compounds. Such intermetallic compounds are brittle and care must be taken (i.e. by avoiding excessive or prolonged heating) to prevent this layer from becoming too thick and thus weaken the joint. Table 1 given hereafter shows the dependence of the thickness of the said layer upon holding time at 310° C., as measured in a straight 20 wt % tin-lead solder alloy over copper. The thickness growth depends upon tin supply from the solder, thus our main aim of lowering the tin content will result in reducing the intermetallic growth. This will also reduce the solder price (tin is the higher priced component), a great benefit by itself.

Table 1: Intermetallic layer thickness after holding for various times at soldering temperature (310° C.):

| Time (sec) | Thickness (μm) |
|---|---|
| 2 | 0.75 |
| 4 | 0.80 |
| 8 | 1.00 |
| 16 | 1.2 |
| 32 | 1.3 |
| 64 | 1.6 |

The wetting of commonly soldered metals is promoted by tin; but tin is relatively high priced and has low mechanical strength. By adding lead its mechanical properties improve and at the eutectic composition the alloy has a convenient melting point of 183° C.

Tin lead eutectic solder (63 wt % Sn) is mandatory for work where exceptionally high quality is required, as for example in high-tech electronics. This alloy can clearly not be substituted for his unique solidification properties. An almost eutectic alloy (60 wt % Sn) is commonly used whenever the difference between it and the eutectic does not impair the quality of the joint to be made. An alternative soldering alloy has been proposed to replace this near-eutectic composition by U.S. Pat. No. 3,945,556 (Manko): 50-57.5% tin, 1.5-4% antimony and the balance lead. It is seen that the savings are not big (replacing 2.5-10 wt % tin by 1.5-4 wt % antimony), nevertheless the alloy is to be accepted as a possible alternative. Not being a eutectic composition there is a gap between the "solidus" temperature (at which the alloy begins to melt) and the "liquidus" temperature (at which the alloy is completely liquid). This solidus to liquidus temperature range (mushy zone) ΔT is, thus, an indicator of an alloy's quality as a solder. Different applications require different mushy zone widths. For most practical purposes in mechanical or electrical assemblies, usage is made of cheaper alloys with a tin content of 30-50 wt % tin having the properties listed in Tables 2, 3 and 4. Our efforts were devoted to develop suitable substitutes to these alloys and offer them to usage with the relevant properties characterized.

There are a number of patents concerning alternative lead-based soldering alloys containing cadmium, bismuth and antimony besides and instead of part of the tin in tin-lead solders:

U.S. Pat. No. 1,301,688 (Gurevich) claims alloys containing 5-20 wt % cadmium, up to 20 wt % tin, balance lead. His preferred composition (10 wt % cadmium, 10 wt % tin, balance lead) is indeed cheap as claimed, but is also a very low-grade solder with a liquidus-solidus gap of 105° C.

U.K. Pat. No. 464,824 (Gohringer) claims for solder alloys comprising up to 3 wt % cadmium, 0.5-5 wt % bismuth, 0.5-5 wt % antimony, 0.5-23.5 wt % tin with balance lead. These compositions do not melt in the range of temperatures of our target tin-lead solders (from 30 wt % tin and up) and can be useful only to special soldering applications where a particularly high liquidus-solidus gap is preferred (higher than 95° C.) by minimizing their flow properties.

Gohringer (Swiss Pat. No. 221,997) claims alloys having from 0.1 to 0.75% bismuth, 1.5-3 cadmium and no antimony. His formulations are liable to have (according to our experience), a melting temperature gap of about 90° C., which is unsuitable for most soft soldering purposes.

Purkhardhofer (U.S. Pat. No. 2,167,678) teaches an alloy "consisting of the following percentage of metals: bismuth 10%, zinc 42%, tin 22%, lead 23%, cadmium 2.95%, silver 0.05%", His claim is specific in the composition, which consists of several components with a substantial amount of zinc. This is a material absolutely deleterious in normal soldering aims.

Bouton (U.S. Pat. No. 2,303,194). The compositions presented by Bouton do not contain any bismuth and antimony, and cover concentrations of 14-22% cadmium and up to 10% tin. These compositions yield alloys having a melting temperature gap by between 80° to 120° C.

Mulligan (G.B. Pat. No. 185,012) claims readily fusible alloys, having melting points between 155° F. and 320° F. (71°-160° C.). These alloys are useless as soldering alloys, being unsuitable because of a multitude of reasons (brittleness, for example). Furthermore, they are low in lead, but high in bismuth and tin, thus increasing the tin intermetallic compounds formation.

Nomaki (U.S. Pat. No. 4,106,930) is mainly concerned "to provide a process for the direct application of a solder alloy to difficulty solderable materials having an oxide surface at a temperature lower than about 180° C.". His compositions contain a deliberate addition of zinc, which is absolutely deleterious for many purposes.

Rudodobiv I Metallurgie, V. 22, 1967, pp. 46 (Library of Congress TN275A1RT8) teaches how specific soldering alloys containing 15% Sn and up to 10% Cd might replace bearing materials. No teaching can be remarked from this reference regarding other soft soldering compositions.

Goldschmidt (U.K. Pat. No. 186,058) teaches bearing metal alloys, all containing from 15 to 22% antimony and a few other components.

Bouton (U.S. Pat. No. 2,303,193) claims soldering alloys containing 0.5-3% cadmium. In addition, his alloys contain 0.1-1.5% copper, something which generally should be avoided, anyway, because of the deleterious influence upon the flow of the molten solder.

Moranne (U.S. Pat. No. 4,231,794) claims solder alloys containing up to a maximum of 2% tin. These alloys have melting ranges from 248° C. upward, which might be useful for some specific purposes.

The above brief review reveals the high interest which the soft soldering arose among researchers for a long time, looking for specific composition posessing improved properties. It is the object of the present invention to provide such new soft soldering compositions based on Pb-Sn. The reduced tin content is beneficial in lowering the intermetallic layer growth, thus improving reliability, while maintaining essentially the wetting and strength properties. Another benefit of the present invention is to provide cheaper compositions, with their related advantages.

THE INVENTION

The present invention relates to soft soldering alloy compositions consisting of from 1 to 35 weight % tin, from 5 to 30 weight % cadmium, from 0.05 to 2.5 weight % antimony and the balance being substantially lead, with or without 1-15 weight % bismuth.

Our compositions contain tin, antimony, with cadmium and/or bismuth and the balance lead, in some critical specified relations, with special emphasis in keeping the liquidus-solidus gap below 75° C., thus preserving the flow qualities of the classic solders containing 30 wt % tin or more. While tin is the main wetting promoter, cadmium performs in a similar way. Thus, cadmium can replace tin partially, but too much of it elevates the melting temperature. Antimony is an integral component of our alloys, being indispensable as a mild melting temperature reducer. In addition it is beneficial in the given amounts, by imparting strength to the bond and drastically reducing oxidation of the molten solder. This is a very important property, needed in the new soft soldering compositions.

PROPERTIES CHARACTERIZATION

Among the most important characteristics of a solder is its solidus to liquidus range, the mushy zone, $\Delta T$. For the eutectic composition $\Delta T$ is 0, but increases as the composition departs from it. Table 2 summarizes the results of these measurements for the standard tin-lead solders and of selected compositions prepared by us. Our primary selection criterion was the achievement of a measured temperature gap of less than 75° C., no information being available for compositions having more than three components. This temperature gap equals that of the 30% Sn tin-lead solder, one of the lowest grade in common use.

TABLE 2

| | Melting properties. | | | | | | | |
|---|---|---|---|---|---|---|---|---|
| | Compositions (weight %) | | | | | | Sol. | |
| Alloy | Sn | Bi | Cd | Sb | Pb | Liq. | (°C.) | $\Delta T$ |
| 63Sn | 63 | — | — | — | 37 | 183 | 183 | 0 |
| 50Sn | 50 | — | — | — | 50 | 212 | 183 | 29 |
| 40Sn | 40 | — | — | — | 60 | 234 | 183 | 51 |
| 30Sn | 30 | — | — | — | 70 | 255 | 183 | 72 |
| A | 33 | — | 22 | 0.5 | 44.5 | 193 | 143 | 50 |
| B | 24 | — | 12 | 0.5 | 63.5 | 213 | 145 | 68 |
| C | 20 | — | 20 | 1.4 | 58.6 | 199 | 144 | 55 |
| D | 22 | 2 | 17 | 0.5 | 58.5 | 193 | 141 | 52 |
| E | 20 | 8.5 | — | 1.4 | 70.1 | 235 | 165 | 70 |
| F | 2 | 10 | 10 | 0.5 | 77.5 | 230 | 196 | 34 |

Another parameter is the "spread percent", which is an indicator of the capability of the solder to wet a surface. This has been determined in the following manner: A small sphere of solder, of known volume, was placed in a shallow dish made of copper, which in turn was placed on a bath of molten metal at a temperature 50° C. above the liquidus point of the specific composition, in order to ensure adequate fluidity. Under these conditions the solder melts almost instantaneously and spreads over a given area. 10 seconds were given to each experiment to reach equilibrium. The spread percent (PW) is then calculated by dividing the difference between the diameter (D) and the height of the drop of solder (H) after it has spread and solidified, by the diameter (D) and multiplied by 100. The mathematical formula is:

$$PW = 100 \times (D - H)/D$$

A non wetting solder stays in the shape of a sphere or nearly so, and the spread percent calculated is nearly 0%. If the solder spreads out evenly, in the form of what may be called a "splash" and its height is very thin, the spread will be near 100%, but this is an idealistic result. For the flux employed (unactivated rosin) a spread of 90% is judged excellent, between 70 to 90% it will be deemed fair to very good and adequate from a technological point of view.

Closely related to the spread percent is the "wetting speed" or "wetting rate" which has been measured by immersing a sheet of copper into a bath of molten solder while suspended from a balance enabling the measurement of the forces exerted on it. As long as the copper is not wetted, the measured force will be the weight of the sheet reduced by the buoyancy in the liquid solder. The moment the solder wets the copper surface, the weight increases until the entire immersed surface is wetted and steady state is reached. The time elapsing between the beginning of immersion and the reaching of a steady state is called wetting time, from which a wetting rate is derived. For the flux employed (unactivated rosin) a wetting time of less than one second is judged to be very good and, of between one and two seconds—good while a wetting time of over two seconds is unadequate. Obviously, the wetting time is temperature dependent, thus, it has been measured at several temperatures.

TABLE 3

| | Wetting properties. | | | | | | | | | | |
|---|---|---|---|---|---|---|---|---|---|---|---|
| | Composition (weight %) | | | | | Spread | Wetting time (sec) (at temp. °C.) | | | | | |
| Alloy | Sn | Bi | Cd | Sb | Pb | (%) | 250 | 260 | 270 | 280 | 290 | 300 |
| 50Sn | 50 | — | — | — | 50 | 88.6 | 0.5 | 0.4 | 0.6 | 0.6 | 0.3 | 0.4 |

TABLE 3-continued

| | | | | | | Wetting properties. | | | | | | |
|---|---|---|---|---|---|---|---|---|---|---|---|---|
| | Composition (weight %) | | | | | Spread | Wetting time (sec) (at temp. °C.) | | | | | |
| Alloy | Sn | Bi | Cd | Sb | Pb | (%) | 250 | 260 | 270 | 280 | 290 | 300 |
| 40Sn | 40 | — | — | — | 60 | 86.2 | — | 0.3 | 0.4 | 0.5 | 0.3 | 0.4 |
| 30Sn | 30 | — | — | — | 70 | 88.8 | — | — | — | 0.6 | 0.3 | 0.3 |
| A | 33 | — | 22 | 0.5 | 44.5 | 68.0 | 1.1 | 1.1 | 1.1 | 1.0 | 1.3 | 0.6 |
| B | 24 | — | 12 | 0.5 | 63.5 | 70.0 | 1.2 | 1.2 | 1.1 | 1.2 | 1.0 | 1.0 |
| C | 20 | — | 20 | 1.4 | 58.6 | 58.1 | 1.1 | 1.2 | 0.9 | 1.2 | 1.0 | 0.6 |
| D | 22 | 2 | 17 | 0.5 | 58.5 | 65.1 | 1.0 | 0.9 | 0.8 | 0.9 | 0.8 | 0.7 |
| E | 20 | 8.5 | — | 1.4 | 70.1 | 70.0 | — | — | 0.6 | 0.6 | 0.6 | 0.6 |
| F | 2 | 10 | 10 | 0.5 | 77.5 | 82.1 | — | 0.7 | 0.8 | 0.7 | 0.7 | 0.8 |

A final criterion of interest is the mechanical strength of the soldered joint, usually measured in shear. This has been measured with the aid of special "plug and ring" specimens. A cylindrical copper ring (1 mm high) with central bore of 1.8 mm has been soldered on a copper rod of 1.7 mm diameter. The two were pulled apart by a suitable machine, recording the strength of the soldered bond.

TABLE 4

| | | Strength properties. | | | | |
|---|---|---|---|---|---|---|
| | Composition (weight %) | | | | | Shear strength |
| Alloy | Sn | Bi | Cd | Sb | Pb | (kg/mm$^2$) |
| 50Sn | 50 | — | — | — | 50 | 5.1 |
| 40Sn | 40 | — | — | — | 60 | 4.9 |
| 30Sn | 30 | — | — | — | 70 | 3.9 |
| A | 33 | — | 22 | 0.5 | 44.5 | 6.1 |
| B | 24 | — | 12 | 0.5 | 63.5 | 6.4 |
| C | 20 | — | 20 | 1.4 | 58.6 | 5.1 |
| D | 22 | 2 | 17 | 0.5 | 58.5 | 5.3 |
| E | 20 | 8.5 | — | 1.4 | 70.1 | 3.7 |
| F | 2 | 10 | 10 | 0.5 | 77.5 | 4.0 |

The shear strengths of the compositions according to the present invention are similar to those measured under the same conditions but prepared from conventional straight tin-lead solders. The quantitative reduction of tin content in the alloys according to the present invention not only decreases considerably the costs thereof, but also lowers the growth rate of the intermetallic layer, resulting in an improvement in their useful life expectance in assemblies working at moderately high temperatures (100° C.). Tests were also carried out for determining the shear strength at 100° C. after prolonged exposure to this temperature, the results thereof comparing very favorably with those of the conventional alloy compositions.

Therefore the above alloys will be found useful in many mechanical and electric applications. The wetting can be improved by the application of an active flux, as commonly known in the art.

The conclusion to be drawn is that solder alloys B, and E can successfully substitute the conventional 30 Sn solder alloy; A, C, and D instead of 40 Sn alloy and finally alloy F is equivalent to 50 Sn solder, with the relative improved performances. This latter alloy, while behaving in a similar way to the 50 Sn solder, has such advantages that it can, in fact, replace each and every other composition, being not only cheap, but having a low tin content its tin intermetallic formation ability is greatly reduced.

While the invention has been described in connection with certain preferred compositions, it will be understood that it is not intended to limit the invention to these particular compositions. On the contrary, it is intended to cover other alternatives, modifications and equivalents, as may be included within the scope of the invention and defined by the appended claims. It should be understood that the particulars described are by way of example and for illustrative purposes, without being limited thereto.

We claim:

1. Soft soldering alloy composition selected from the group consisting of:
   an alloy consisting essentially of 33 wt % tin, 22 wt % cadmium, 0.5 wt % antimony and balance lead;
   an alloy consisting essentially of 24 wt % tin, 12 wt % cadmium, 0.5 wt % antimony and balance lead; and
   an alloy consisting essentially of 20 wt % tin, 20 wt % cadmium, 1.4 wt % antimony and balance lead.

2. Soft soldering alloy composition according to claim 1, consisting essentially of 33 wt % tin, 22 wt % cadmium, 0.5 wt % antimony and balance lead.

3. Soft soldering alloy composition according to claim 1, consisting essentially of 24 wt % tin, 12 wt % cadmium, 0.5 wt % antimony and balance lead.

4. Soft soldering alloy composition according to claim 1, consisting essentially of 20 wt % tin, 20 wt % cadmium, 1.4 wt % antimony and balance lead.

5. A soft soldering alloy composition selected from the group consisting of:
   an alloy consisting essentially of 22 weight % tin, 17 weight % cadmium, 0.5 weight % antimony, 2 weight % bismuth and balance lead; and
   an alloy consisting essentially of 2 weight % tin, 10 weight % cadmiun, 10 weight % bismuth, 0.5 weight % antimony and balance lead.

6. Soft soldering alloy composition according to claim 5, consisting essentially of 22 wt % tin, 17 wt % cadmium, 0.5 wt % antimony with addition of 2 wt % bismuth and balance lead.

7. Soft soldering alloy composition according to claim 5, consisting essentially of 2 wt % tin, 10 wt % cadmium, 10 wt % bismuth, 0.5 wt % antimony and balance lead.

8. Soft soldering alloy composition according to claim 5, consisting essentially of 20 wt % tin, 1.4 wt % antimony with addition of 8.5 wt % bismuth and balance lead.

* * * * *